US011740481B2

(12) United States Patent
McGettigan et al.

(10) Patent No.: US 11,740,481 B2
(45) Date of Patent: Aug. 29, 2023

(54) POLARIZATION FOLDED PATH DEVICE WITH COMPLEMENTARY ANGLE FILTERING

(71) Applicant: META PLATFORMS TECHNOLOGIES, LLC, Menlo Park, CA (US)

(72) Inventors: Anthony D. McGettigan, Santa Rosa, CA (US); Gary D. Sharp, Boulder, CO (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 406 days.

(21) Appl. No.: 16/591,044

(22) Filed: Oct. 2, 2019

(65) Prior Publication Data

US 2020/0241312 A1    Jul. 30, 2020

Related U.S. Application Data

(60) Provisional application No. 62/740,347, filed on Oct. 2, 2018.

(51) Int. Cl.
| | |
|---|---|
| G02B 27/28 | (2006.01) |
| G02B 27/01 | (2006.01) |
| G02B 27/30 | (2006.01) |
| G02B 5/30 | (2006.01) |

(52) U.S. Cl.
CPC .............. *G02B 27/286* (2013.01); *G02B 5/30* (2013.01); *G02B 27/0172* (2013.01); *G02B 27/30* (2013.01)

(58) Field of Classification Search
None
See application file for complete search history.

(56) References Cited

U.S. PATENT DOCUMENTS

| | | | | |
|---|---|---|---|---|
| 2006/0238867 | A1* | 10/2006 | Takeda | G02B 27/288 |
| | | | | 359/485.02 |
| 2007/0273798 | A1* | 11/2007 | Silverstein | G02B 27/1046 |
| | | | | 348/752 |
| 2015/0124302 | A1* | 5/2015 | Leister | G03H 1/0841 |
| | | | | 359/9 |
| 2015/0293272 | A1* | 10/2015 | Pham | B29C 59/026 |
| | | | | 205/95 |
| 2017/0068100 | A1* | 3/2017 | Ouderkirk | G02B 5/30 |
| 2018/0039052 | A1* | 2/2018 | Khan | G02B 27/283 |
| 2019/0353943 | A1* | 11/2019 | Smith | G02F 1/134309 |

* cited by examiner

*Primary Examiner* — Derek S. Chapel
(74) *Attorney, Agent, or Firm* — Greenberg Traurig, LLP

(57) ABSTRACT

An imaging system that contains a display, a polarization folded path lens with an intended image signal path and an exit pupil wherein light entering the PFP lens from the display substantially follows the intended signal path. A variant of this system is disclosed where the light entering the PFP lens substantially follows the signal path and leaves via the Exit pupil (as opposed to being aperture). Compared to the prior art, the techniques described herein improve transmission efficiency and reduce corruption of the image by non-signal path light.

20 Claims, 7 Drawing Sheets

Schematic of an embodiment of the invention showing angle filter (501)

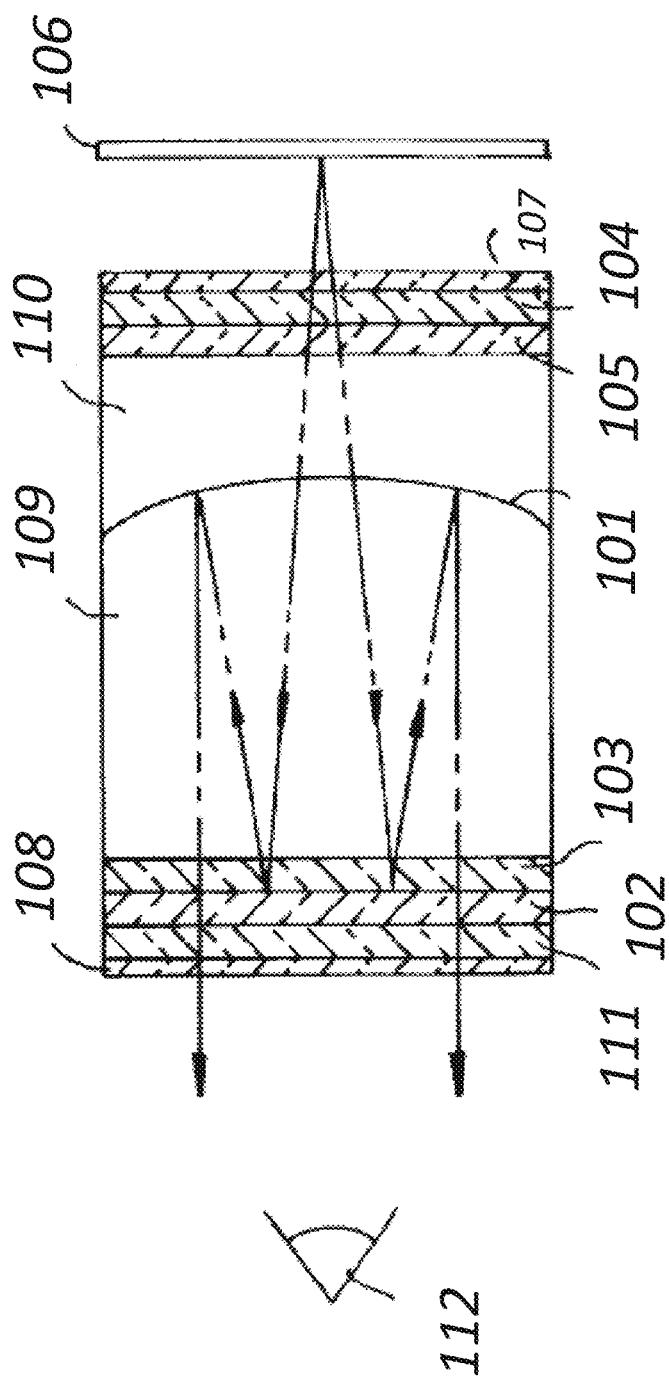
FIGURE 1. Prior art wide-angle collimator (from US Pat No 6,075,651)

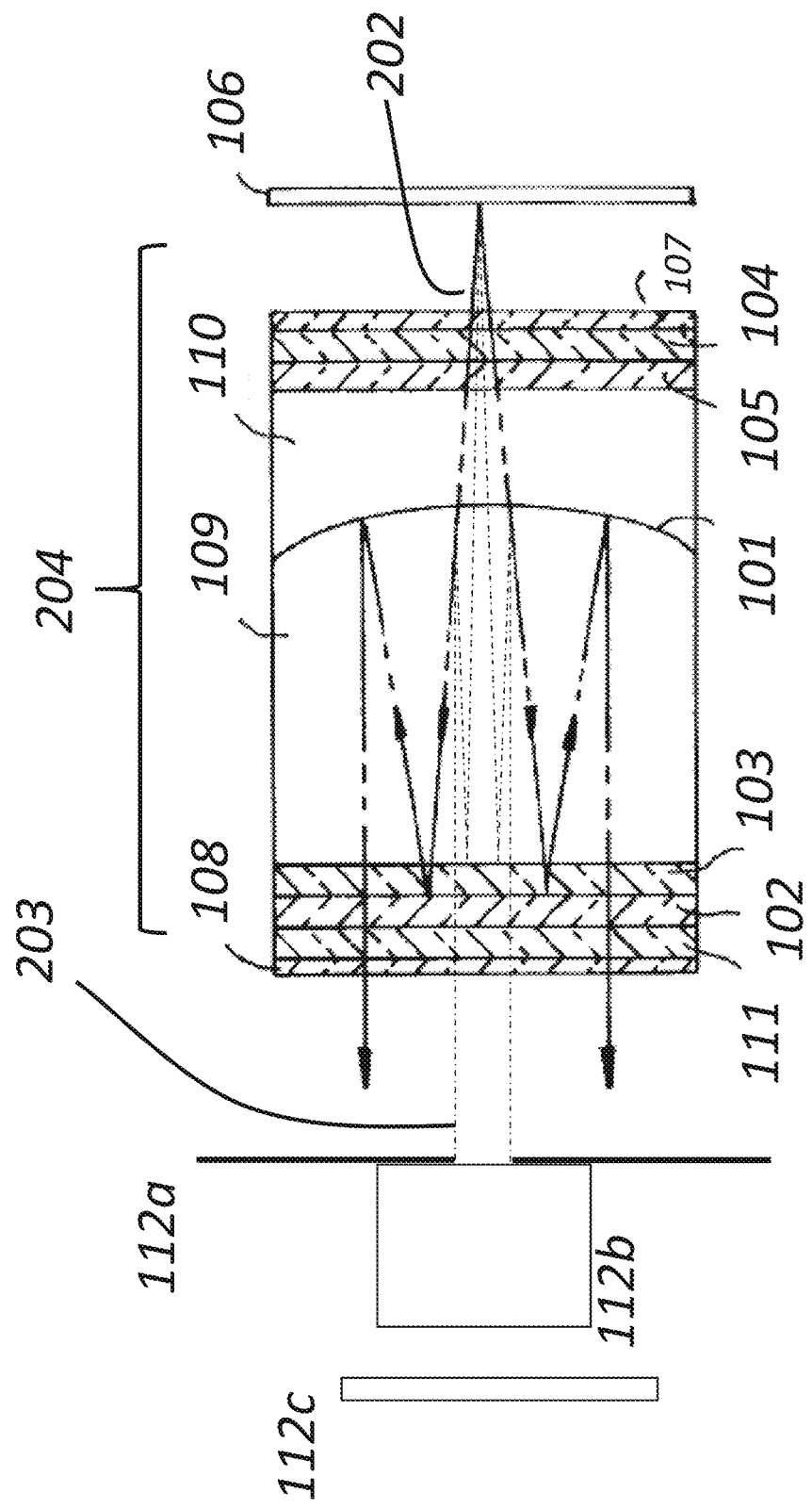
FIGURE 2. PFP system with exit pupil, signal path, signal bundle and polarization sensitive area

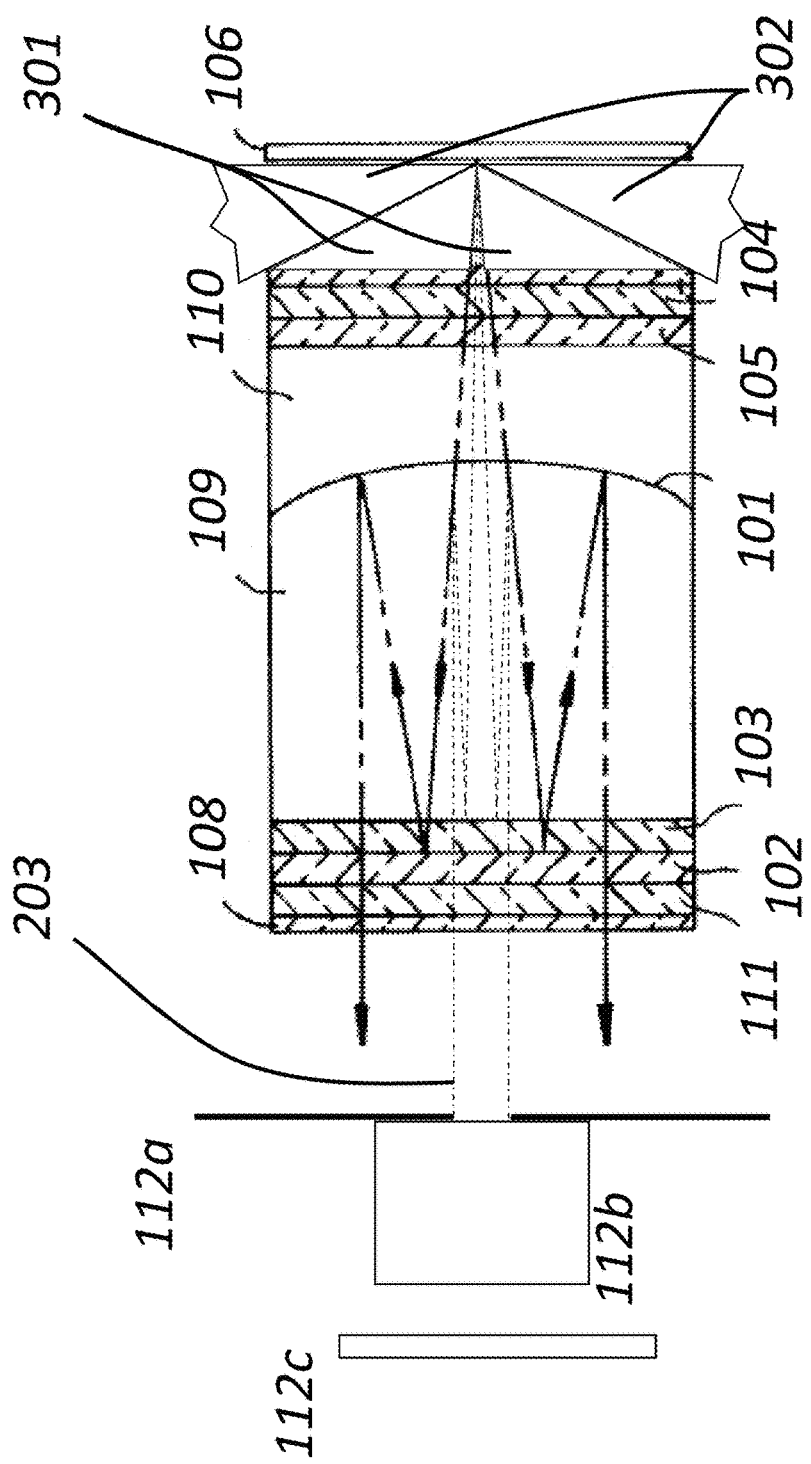
FIGURE 3. PFP system showing signal bundle (203), exit overfill bundle (301) and input overfill bundle (302)

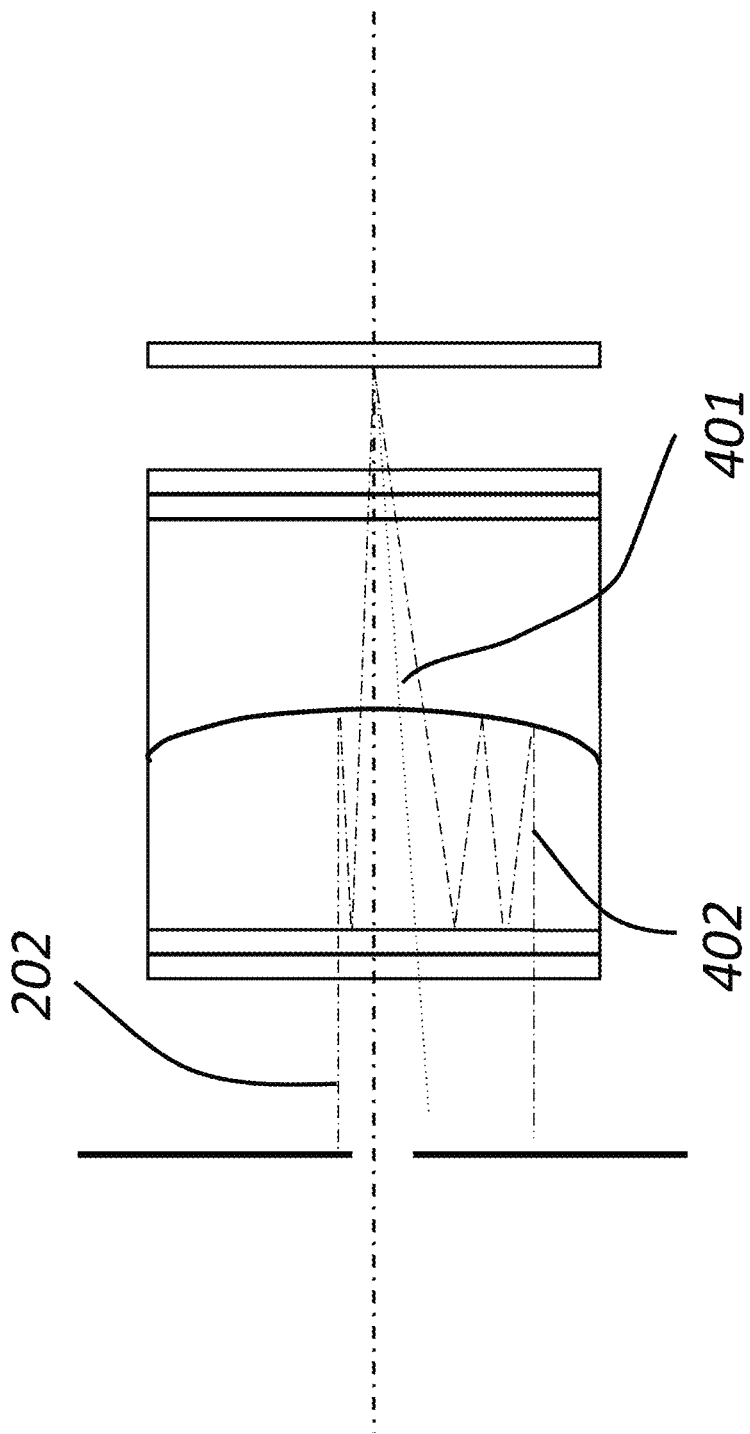
FIGURE 4. Signal paths and non-signal paths through the system

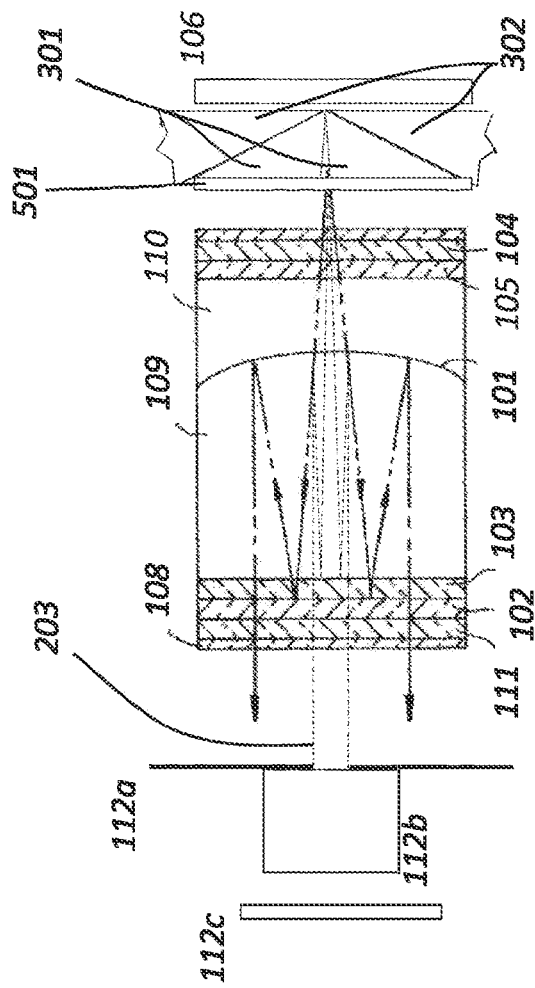
FIGURE 5. Schematic of an embodiment of the invention showing angle filter (501)

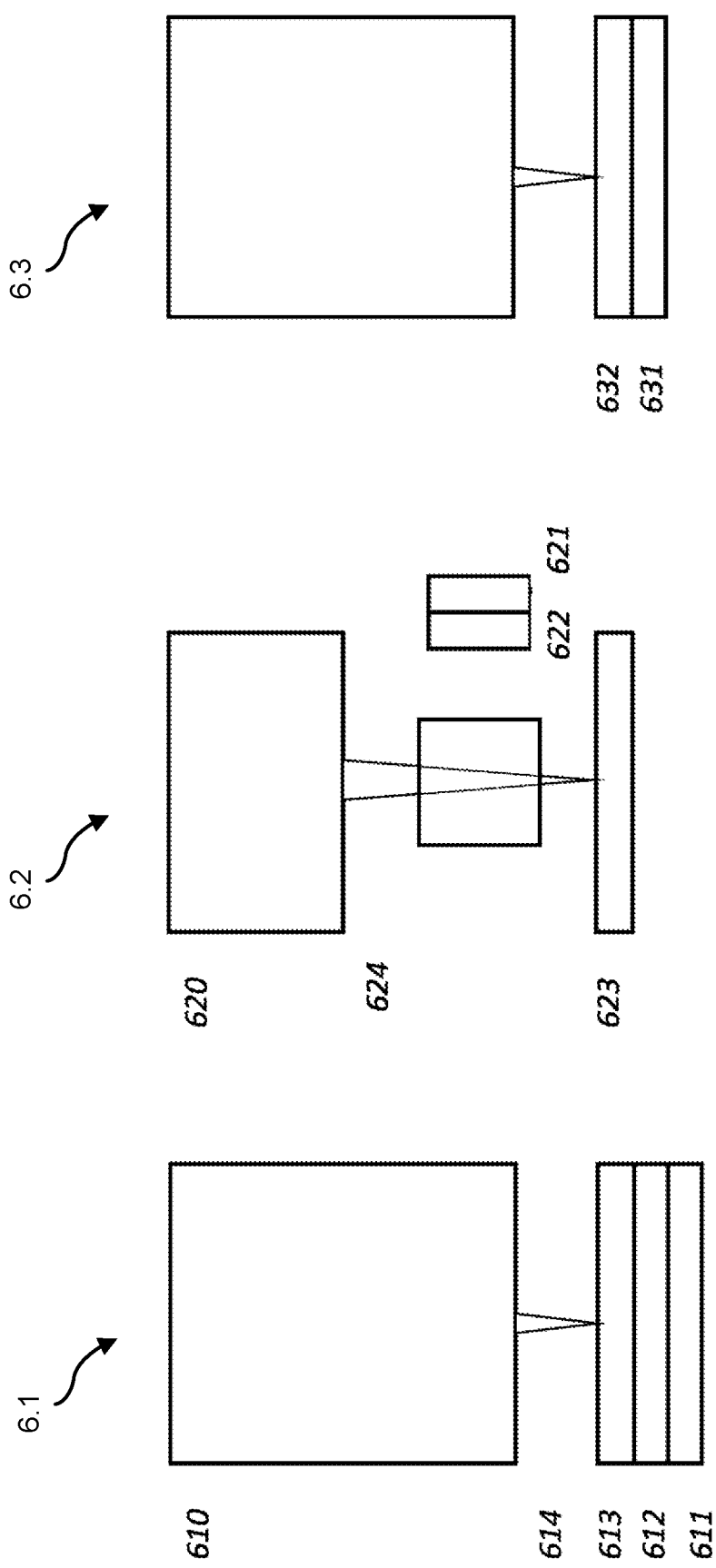
FIGURE 6. Embodiments of the invention for backlit (6.1), front lit (6.2) and emissive displays (6.3)

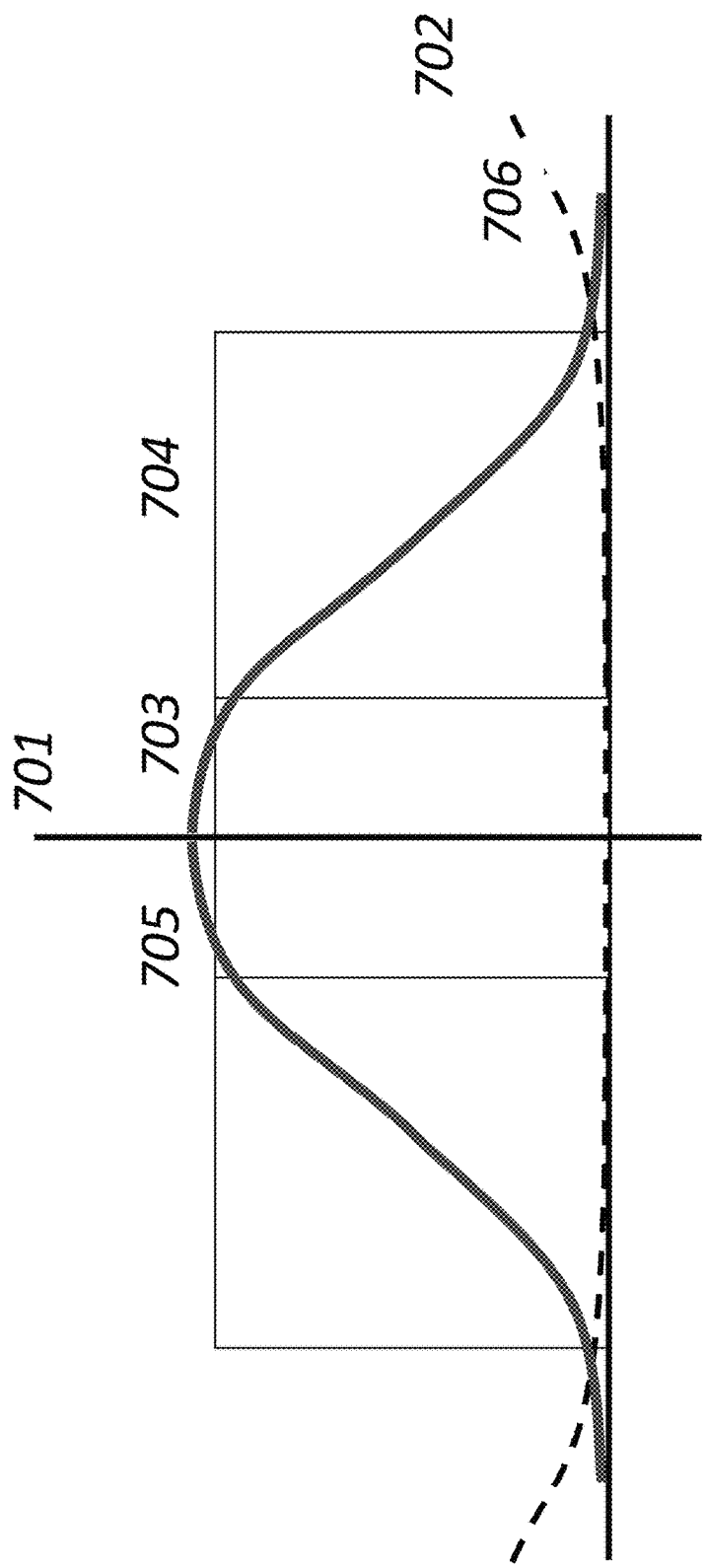
FIGURE 7. Angle plot showing signal bundle, angle filter, and polarization degradation area

POLARIZATION FOLDED PATH DEVICE WITH COMPLEMENTARY ANGLE FILTERING

CROSS-REFERENCE TO RELATED APPLICATIONS

This application claims priority to U.S. Provisional Application No. 62/740,347 filed Oct. 2, 2018, the contents of which are incorporated herein by reference in its entirety.

BACKGROUND

This invention relates to Polarization Folded Path devices (PFP). These devices are used in a variety of applications where compact collimation is needed including viewfinders, sights and head mounted displays such as virtual reality systems.

U.S. Pat. No. 6,075,651 discloses a compact collimating apparatus to enable a compact, lightweight display system (FIG. 1). The architecture uses a combination of polarization management components to fold a light path. The heart of the system is an optical cavity with a partial reflector at the input (101) and a polarization selective reflector (102) at the output. A quarter-wave retarder (103) is placed in the cavity such that a round trip of the cavity converts polarization state. A circular polarizer (104, 105) manages the polarization entering the cavity from an outside source (106) such that light is reflected on first pass and transmitted on second pass, thereby achieving the desired fold. The figure also shows anti-reflection coatings (107, 108); optical elements (109, 110); a clean-up polarizer (111) and an observer (112). We term this arrangement a "Polarization Folded Path" (PFP) device.

US Application 2018/0039052 describes a Head Mounted Display system using a Polarization Folded Path architecture to enable compact collimation.

SUMMARY

Disclosed herein is a polarization folded path device with matching illumination optics that includes an illumination system with associated light management optics (illumination), a polarization folded path cavity and an exit pupil. The illumination is arranged, in concert with the polarization films and partial reflectors, to optimize system transmission and contrast.

The system includes an illumination source that either alone, or with other elements, produces circularly polarized light with a particular spatio-angular distribution. Specifically, the angular distribution of the light, which may be spatially uniform OR spatially variant, is such that light entering the PFP cavity substantially follows the intended folded path. A second embodiment further constrains the angular distribution such that light entering the PFP cavity, substantially follows the intended folded path AND leaves the PFP cavity through the exit pupil. In both cases, the illumination system may be emissive, frontlit or backlit.

In a preferred embodiment, the illumination system is shaped to create the required spatio-angular distribution without need for angle filtering.

Disclosed herein is an imaging system that includes a display; a Polarization Folded Path lens with associated signal path; and an exit pupil. The ray bundles in the PFP lens substantially follow the signal path.

The light entering the PFP lens may substantially leave via the Exit Pupil. The Exit Pupil area may be smaller than the area of the Display that is intended to be imaged. The display may be backlit. The display may be frontlit. The display may be an LCD, an OLED, or a MicroLED.

Illumination of the display may be controlled to manage the angular distribution of light leaving the display. Light leaving the display may be substantially collected into the PFP lens. More than 3% of light leaving the display may follow the signal path through the PFP lens and leave via the Exit Pupil. Light entering the PFP cavity may be restricted to a 30° cone.

Also disclosed is an imaging system that includes a display; a Polarization Folded Path lens with associated signal path; an exit pupil; and a Polarization Based Angle Filter placed between the display and the PFP lens.

Also disclosed is an imaging system that includes a display; a light management system that modifies the angular distribution of the display; a Polarization Folded Path lens with associated signal path; and an exit pupil. The ray bundles leaving the light management system are substantially collected by the PFP lens. The ray bundles in the PFP lens substantially follow the signal path.

The light entering the PFP lens may substantially leave via the Exit Pupil. The Exit Pupil area may be smaller than the Display area. The display may be backlit. The display may be frontlit. The display may be an LCD, an OLED, or a MicroLED.

BRIEF DESCRIPTION OF FIGURES

FIG. 1: Is a prior art schematic view of a Polarization Folded Path (PFP) system.

FIG. 2: Shows the signal path, signal bundle and polarization sensitive area.

FIG. 3: Shows the signal bundle, exit overfill bundle and input overfill bundle.

FIG. 4: Shows the signal path and some non-signal paths through the system.

FIG. 5: Is a schematic view of an inventive Polarization Folded Path Device with Complementary Angle Filtering.

FIG. 6: Is a schematic view of backlit, frontlit and emissive embodiments.

FIG. 7: Is a representative plot showing the image bundle, angle filter region and polarization degradation region.

DETAILED DESCRIPTION

The embodiments shown herein are susceptible to various modifications and alternative forms, specific embodiments thereof have been shown by way of example. It should be understood however, that it is not intended to limit the invention to the particular form disclosed, but rather, the invention is to cover all modifications, equivalents, and alternatives as defined by the claims.

With regard to the techniques discussed in the Background, in the discussed systems, it has been observed that the image is provided by a display that is either frontlit, backlit or self-emissive. Illumination of the display can be as much as 25% of the system power budget. As such, illumination efficiency (photons reaching user/photons generated) is an important consideration for system efficiency and battery life.

Another aspect of PFP systems is that the "fold" is accomplished using polarization management films and reflective surfaces, both of which have strong angular dependency. As such, the system transmission and contrast depend on the range of angles over which the polarization management components operate.

From the foregoing it is apparent that a Polarization Folded Path device is desired, with an illumination system that is matched, in angle space, to the high-performance area of the polarization management films and the high transmission area of the folded path cavity.

FIG. 2 shows the PFP system of FIG. 1, further breaking down the observer (FIG. 1, 112) into three elements: pupil (112a), lens (112b) and detector (112c). The lens gathers light from the pupil and creates an image on the detector in the usual manner.

FIG. 2 also shows:
- 202 the signal path (i.e. the folded path the image is designed to take through the system),
- 203 the signal bundle (i.e. the ray bundle that follows the signal path from object to image), and
- 204 the polarization sensitive area (i.e. the area where effective polarization management is needed to put light on the signal path and keep it there).

FIG. 3 breaks 'signal path light' into three bundles:
1. Signal: Signal path rays that travel from object through pupil to image (203)
2. Exit overfill: Signal path rays that enter the cavity but are vignetted (e.g., at exit pupil (301))
3. Input overfill: Signal path rays that do not enter the cavity (302)

At issue is how the illumination system directs light into these three bundles and whether the polarization management films can ensure that light in the signal bundle leaves through the Exit Pupil as intended and light in the Exit Overfill bundle remains on the signal path so that it is effectively apertured at the Exit Pupil as intended.

As an illustrative case, assume the illumination system is an LCD display with a Lambertian distribution (a commonly available and cost effective micro display), the cavity is designed to work with a normal incidence ±10° ray bundle (the sweet spot for many polarization management films) and the angle subtended by the cavity's input face to the display is 120° (for compactness reasons). For simplicity we assume the system is telecentric and the exit pupil is sized so that the entire display can be imaged.

Once again for simplicity, assuming a randomly polarized source and ideal components, we get a theoretical transmission, without considering collection efficiency of:

$$T_{ideal} = \eta_{CP1} \cdot \eta_{50} \cdot \eta_{50} = 0.5 \times 0.5 \times 0.5 = 0.125 \text{ where}$$

$T_{ideal}$ is the ideal transmission efficiency of the system (ideal components) and
$\eta_{CPI}$, $\eta_{50}$ are the efficiencies of the ideal polarizer and partial reflector respectively Taking Collection Efficiency into consideration gives:

$$T_{system} = T_{ideal} \cdot P_{signal}/P_{illum} \text{ where}$$

$P_{signal}$ is the optical power in the signal beam bundle and
$P_{illum}$ is the optical power in the illumination bundle The illustrative example assumes a Lambertian distribution so:

$$P_\Theta = \frac{1}{2}(1-\cos 2\Theta)/P_{\pi/2} \text{ where}$$

$P_\Theta$ is the optical power in a cone of subtended angle $\Theta$ and
$P_{\pi/2}$ is the optical power emitted into the hemisphere Assuming a signal bundle of ±10° and normalizing $P_{\pi/2}$ to 1 gives:

$P_{signal}/P_{illum} = P_\Theta = \frac{1}{2}(1-\cos(20)) = 0.03$ which gives:
$T_{system} = T_{ideal} \cdot P_{signal}/P_{illum} = (0.125)(0.03) \approx 0.003$ or 0.3%

The transmission efficiency issue comes from the fact that low cost, widely available Lambertian displays are a mismatch to the PFP cavity's angular constraints which are driven by the need to manage polarization over wavelength and angle using polarization management films. These films work best in a small ray bundle near Normal Incidence.

The techniques discussed herein address the Transmission Efficiency issue by providing an illumination system that is largely matched, in angle space, to the requirements of the PFP cavity. Optimizing Transmission Efficiency requires optimizing the match between light leaving the display and light collected into the PFP Exit Pupil, namely, minimizing the Input Overfill and Exit Overfill bundles.

Different systems have different requirements for power budget and so have different pressures on Transmission Efficiency. However, using and illustrative example as a starting point, and concentrating on the Collection Efficiency of the PFP cavity (calculated above as 3%), there is clearly significant room for improvement. Given this low starting point, designing the illumination such that the PFP cavity collection efficiency is 30% would yield an overall Transmission Efficiency above 3%.

Using a conventional Lambertian illumination system may consume as much as 25% of the overall system's power budget. In the above illustrative example, it can be seen that less than 0.5% of the generated light reaches the user. The displays disclosed herein can improve this from less than 0.5% to circa 10% which would allow for an approximate 20× reduction in the power required by the backlight.

Turning attention to image quality and referring again to the illustrative example above and the Exit Overfill Bundle (301) and Input Overfill Bundle of FIG. 3. A less demanding optimization focuses on image quality rather than transmission efficiency as such, transmission penalties are considered acceptable as long as the offending light does not end up corrupting the image. The Input Overfill bundle (302) does not enter the PFP cavity and so cannot travel to the Exit Pupil. By contrast, the Exit Overfill bundle enters the cavity but will be aperture at the Exit Pupil IF the rays follow the intended signal path. As such, optimizing the illumination system for image quality is equivalent to optimizing to ensure that rays entering the PFP cavity substantially follow the signal path.

In arrangements similar to our illustrative example, the majority of rays entering the PFP cavity are outside the signal bundle and, as such, will not follow the signal path AND leave through the Exit pupil. Looking just at the PFP cavity, the ideal Transmission Efficiency is:

$$TC_{ideal} = \eta 50 = 0.5 \text{ where}$$

$TC_{ideal}$ is the ideal Transmission Efficiency of the PFP cavity and
$\eta_{50}$ is the efficiency of the Partial reflector (as before)

Once again, considering Collection Efficiency while retaining other aspects of our simple model gives:

$$TC_{real} = TC_{ideal} \cdot P_{signal}/(P_{signal} + P_{exit}) \text{ where}$$

$TC_{real}$ is the Transmission of the ideal cavity given Collection Efficiency constraints and
$P_{signal}$, $P_{exit}$ are the optical powers in the signal and exit overfill beams respectively Using the geometry of our illustrative example gives:
$P_{signal}/(P_{signal} + P_{exit}) = 0.03/(0.75) = 0.04$ and so
$TC_{real} = 0.02$ or 2%

As can be seen, in the illustrative example, over 90% of the light entering the cavity does not follow the signal path to the Exit Pupil. If these Exit Overfill rays follow the signal path, they can be extinguished at the Exit Pupil. In some respects, this is an ideal case, as the rays represent a loss in throughput but do not corrupt the image.

However, in practical embodiments, it is difficult to ensure that all rays entering the PFP cavity follow the signal path because having a ray follow the signal path depends on:
  polarization management films to present the reflective polarizer with linearly polarized light,
  polarization management films to rotate the polarization state for the second pass, AND
  other components to do no harm.

In reality, the polarization management components are imperfect with deteriorating performance away from normal incidence. Furthermore, other components corrupt polarization due to birefringence, diattenuation and other effects. Consequently, although the design intent is to have light reach the detector by the signal path, light can also reach the detector on non-signal paths leading to unwanted ghost images and/or veiling glare (Viewing Optics for Immersive Near-eye Displays: Pupil swim/size and weight/stray light, Geng, Gollier, Wheelwright, Salai, Peng et al, *Proceedings, SPIE Photonics Europe*, 2018).

By way of example, FIG. 4 shows the signal path (202) and several non-signal paths (401, 402). For convention we term these paths $RT_n$ where RT refers to Round Trip and n refers to the number of trips made in the cavity. $RT_1$ is the signal path with its single fold (202). $RT_0$ is a path straight through the cavity without any fold (401) and $RT_2$ is a path with two Round Trips in the cavity (402). FIG. 4 is not exhaustive as many other non-signal paths may arise from Fresnel reflections, scatter and other sources.

Clearly, if the 'Exit Overfill' rays follow the signal path, they will be extinguished at the Exit Pupil. If they follow another path ($RT_0$, $RT_2$) they may make it through the Exit Pupil and corrupt the signal. Combining these observations, it is clear that light entering the PFP cavity outside the signal bundle represents a certain penalty in throughput and a potential penalty in image quality.

For these reasons, a PFP cavity is more sensitive to illumination than a conventional lens. In a conventional lens, signal light propagates from input to exit without recirculation and without strong polarization dependence. Straight through propagation simplifies baffling and controlling ray bundles that reach the exit pupil. Furthermore, non-signal paths are largely due to Fresnel reflections which can be managed to less than 0.5% using conventional anti-reflection coatings.

By contrast, in the PFP lens, light recirculates, the light path taken is polarization dependent, the polarization components are angle dependent and several components have high reflectivity (>25%). For these reasons, it is incorrect to assume that rays outside the signal bundle will be baffled by the exit pupil and surrounding walls. On the contrary, these rays are most prone to depolarization after which they follow non-signal paths which can bring them to the exit pupil where they corrupt the signal. Furthermore, because of recirculation, it is difficult to baffle inside the PFP lens. These considerations make it especially important to match rays entering the PFP cavity to the capability of the polarization management films thereby ensuring these rays largely follow the signal path.

With respect to non-signal paths (eg $RT_0$, $RT_2$, $RT_n$), each round trip in the cavity attenuates the light by approximately a factor of 2, due to the action of the 50/50 partial reflector. As such, $RT_0$ is the strongest of the non-signal paths and, due to its corrupting effects, in certain designs it may represent a limit to the practical angular extent of the signal bundle.

These techniques address the Image Quality issue by providing an illumination system that largely presents the PFP cavity with light that follows the signal path. This is equivalent to ensuring that light entering the PFP cavity is in a range of angles that allow the polarization management films to manipulate the polarization in the intended way as light propagates through the cavity thereby ensuring that non-signal paths are low and do not corrupt the image.

The $RT_0$ path requires specific attention as it is not attenuated by the 50/50 reflector and it does not see the optical power of the PFP cavity. For these reasons, it can lead to a strong ghost image that lies substantially inboard of the intended image and is clear, though out of focus. Though different systems have different contrast and image quality specifications, the tolerable brightness of this $RT_0$ ghost can be a guideline for the matching requirement of the illumination system to the PFP cavity in order to achieve image quality goals.

For example, US Patent Application Pub. No. 2018/0101020 (the contents of which are incorporated herein by reference) discloses an arrangement where the axis of the first and second quarter-wave retarders are orthogonal to each other (Crossed). This arrangement has the advantage of presenting Linear Polarization to the Reflective Polarizer and thereby reducing the impact of the $RT_0$ non-signal path BUT only for near Normal Incidence rays.

US Patent Application Publication No. 2019/0271853, Retarder Stack Pairs for Polarization Basis Vector Transformations (the contents of which are incorporated herein by reference), examines the problem of $RT_0$ path leakage for off-normal rays in the Crossed system and proposes an alternate arrangement (Reverse Order Reflected Around Zero) for reducing $RT_0$ leakage over a broader range of angles.

From 2019/0271853, it is clear the $RT_0$ path strength depends on the design of the polarization management stacks. Leading to a sequence where the Exit pupil is sized, the stacks are designed, the tolerable $RT_0$ is assessed and the illumination is designed to ensure light entering the PFP cavity allows the $RT_0$ requirement to be met. The prior art is silent on these details.

The above term "largely presents the PFP cavity with light that follows the signal path" can be interpreted in terms of the system requirements. Many systems require a contrast of above 50:1 and this requirement is continually increasing. In the PFP system, the angular dependence of the Polarization Management stacks means that the contrast depends on the azimuth and polar angle (as described in 2019/0271853). In this case, we can consider a worst case angle set, and ensure that it continues to meet the contrast and $RT_0$ requirement. Again referring to 2019/0271853, in the case of an ROC system, with a 50:1 contrast goal, this involves restricting the light entering the PFP cavity to a 30° cone, while for a RORAZ system, with the same specification, a cone as broad as 50° would be acceptable.

Several other patents and applications (US 2018/0039052, US 2018/0120579; the contents of each of which are each incorporated herein by reference) propose using the PFP arrangement. Further improvements to the concept have also been disclosed such as the use of circular polarizers to 'ghost bust' unwanted reflections, the use of cleanup polarizers and other components to improve polarization management.

The advantages of the disclosed techniques apply equally to each of the above arrangements, whether a ROC configuration is used (with its associated $RT_0$ sensitivities and limitations on angular extent) or a RORAZ configuration is used (with its ability to reduce $RT_0$ at high angles).

Our novel techniques provide a PFP device with matching illumination to improve transmission efficiency, and image quality (FIG. 5). Existing illumination and beam shaping techniques can be used. The key consideration is to design the illumination system in concert with the performance requirements of the PFP cavity to avoid transmission and image quality penalties. The signal bundle and the associated illumination may be spatially uniform or variant; angularly symmetric or asymmetric; and arranged around the normal or oblique.

In one embodiment, an angle filter (501) manages the illumination such that substantially only the signal bundle enters the cavity. In the case of a telecentric system the angle filter can be spatially uniform. Co-pending U.S. Application 62/745,060 "Polarization Based Filters with Angle-Sensitive Transmission" describes methods for angle filtering that is compatible with the requirements of imaging. Furthermore, light leaving these Polarization Based Angle Filters is linearly polarized and so is appropriate for feeding an AQWP to create Circularly Polarized light as required by the PFP cavity. In a preferred embodiment, the angle filter is a Polarization Based Angle Filter as disclosed in 62/745,060.

In a second embodiment, FIG. 6.1, a backlit micro-display is used and the desired illumination pattern is achieved in the backlight using a variety of techniques known in the art including, but not limited to, waveguides, light distribution films, and micro-collimators. The backlight unit (611) feeds the angle filter (612) which in turns feeds the display (613) resulting in light leaving the display (614) substantially in the signal bundle of the PFP (610). A further angle filter can be added after the display as needed.

In a third embodiment, FIG. 6.2, a reflective micro-display is front lit and the desired illumination pattern is achieved using techniques known in the art including, but not limited to, light pipes, relays lenses and flyseye systems. A light source (621) feeds an angle filter (622) which in turn feeds the display (623) again resulting in light leaving the display (624) substantially in the signal bundle of the PFP (620).

In a fourth embodiment, FIG. 6.3, the micro-display is emissive and the desired illumination is achieved with techniques known in the art such as micro-cavities, micro-lenses and light control films. Light is generated in the display (631) and fed to an angle filter (632) which in turn feeds the PFP. The angle filter is designed such that light entering the PFP is substantially in the signal bundle of the PFP.

The disclosed techniques highlight two issues: transmission efficiency and image quality. Transmission efficiency is impaired whenever an illumination photon does not reach the user. However, image quality is only impaired where rays entering the PFP cavity leave the cavity on a path other than the signal path. To illustrate the distinction, FIG. 7 shows a representative angle plot of ray bundles passing through the PFP cavity. At the center is normal incidence through the quarter wave retarders (701). As the angle moves from normal incidence the performance of the polarization management components deteriorates (702) until, in the compromised region (706), these components no longer allow the system to meet its image quality objectives.

The signal bundle (703) is placed near normal incidence to allow the signal to harvest the 'best performing rays' from a polarization management perspective. In the transition region (704) the polarization management components operate well enough to keep these rays on the signal path. As such, they are extinguished at the Exit pupil. Rays in this region represent a transmission efficiency penalty but do not impact image quality. Moving further from Normal Incidence, in the compromised region (706) the polarization management components can no longer keep the rays on the signal path and other paths (eg $RT_0$, $RT_2$, $RT_n$) come into play. In this region, the mismatched illumination is a penalty for both transmission efficiency and image quality.

Ideally, the illumination system only provides light in the signal bundle as this minimizes penalties to transmission and image quality. However, for a variety of reasons this may not be practical or even possible. For example, the imaging system may be required to provide largely uniform brightness across the display which, in turn, may require largely uniform angular illumination to be collected across the display. In such cases, delivering light into the signal bundle only would require a step filter in angle space with a sharp cutoff at the edge of the signal bundle. Such filters can be difficult and expensive to implement.

For these reasons, a preferred approach is to design the polarization management films to provide an envelope region beyond the signal bundle where the films continue to manage polarization effectively and keep rays in the PFP cavity on the signal path. This provides a transition region (704) for illumination system design and avoids the need for a step cutoff filter. With such a design a soft transition (705) in the illumination system will not carry an Image Quality penalty.

In a representative embodiment, the image bundle is within $\pm 15°$ around normal and the signal degradation region is beyond $\pm 30°$, leaving a 15°-30° window for the angle filter transition. Again, whether the system is emissive, frontlit or backlit, this type of illumination transition can be achieved using a variety of techniques known in the art (light guides, light management films, microlens arrays, micro-cavities).

A further design consideration is etendue matching between the illumination system and the PFP cavity. The viewing angle and size of the exit pupil determine the target etendue which sets a starting point for the illumination system etendue. In typical designs, the display panels are larger than the PFP exit pupil, meaning that the angular extent of the panel illumination should be correspondingly smaller than the exit pupil viewing angle. This clarifies the distinction between solving the illumination problem by designing the source and solving the problem by filtering the source.

Where the illumination problem is solved at the source, the etendue matching is considered upfront and the generated rays that enter the PFP cavity largely follow the signal path to the Exit Pupil with some acceptable overfill. As all rays follow the signal path, the overfill rays are extinguished at the Exit Pupil and there is minimal image quality corruption. As the etendue is matched, the amount of overfill is as needed for brightness uniformity without presenting and excessive transmission penalty.

If the etendue of the source is significantly larger than that of the Exit Pupil, by example where a Lambertian Display panel is used, the illumination problem must be solved by filtering. In this way, the design can still avoid an image quality penalty but there will be an inevitable transmission penalty associated with the etendue mismatch.

The invention claimed is:

1. An imaging system, comprising:
   a display;
   an exit pupil;
   a Polarization Folded Path (PFP) lens with an associated signal path that comprises an exit overfill bundle path for exit overfill light from the display, the exit overfill bundle path being apertured at the exit pupil rather than traveling through the exit pupil; and a polarization-based angle filter between the display and the PFP lens that manages distribution of exit overfill light leaving the display such that an amount of exit overfill light that leaves the exit overfill bundle path is reduced.

2. The system of claim 1, wherein the associated signal path comprises a single bundle path, the signal path traveling through the exit pupil.

3. The system of claim 1, wherein the display has an area and wherein the exit pupil area is smaller than the area of the display.

4. The system of claim 1, wherein the display is backlit.

5. The system of claim 1, wherein the display is frontlit.

6. The system of claim 1, wherein the display is a Liquid Crystal Display (LCD).

7. The system of claim 1, wherein the display is an Organic Light-Emitting Diode (OLED).

8. The system of claim 1, wherein the display is a Microscopic Light-Emitting Diode (MicroLED).

9. The system of claim 1, wherein light leaving the display is collected into the PFP lens.

10. The system of claim 1, wherein more than 3% of light leaving the display follows the signal path through the PFP lens and leaves via the exit pupil.

11. The system of claim 1, wherein light entering the PFP cavity is restricted to a 30° cone.

12. An imaging system, comprising:
a display;
an exit pupil;
a Polarization Folded Path (PFP) lens with associated signal path that comprises an exit overfill bundle path for exit overfill light from the display, the exit overfill bundle path being aperture at the exit pupil rather than traveling through the exit pupil; and
a polarization-based angle filter placed between the display and the PFP lens that manages distribution of exit overfill light leaving the display such that an amount of exit overfill light that leaves the exit overfill bundle is reduced.

13. An imaging system, comprising:
a display having an angular distribution;
a light management system that modifies the angular distribution of the display and that linearly polarizes light leaving the display;
an exit pupil; and
a Polarization Folded Path (PFP) lens with associated signal path that comprises an exit overfill bundle path for exit overfill light from the display, the exit overfill bundle path being apertured at the exit pupil rather than traveling through the exit pupil;
wherein ray bundles leaving the light management system are collected by the PFP lens, and
wherein ray bundles in the PFP lens follow the signal path.

14. The system of claim 13, wherein the associated signal path comprises a single bundle path, the signal path traveling through the exit pupil.

15. The system of claim 13, wherein the display has an area and wherein the exit pupil is smaller than the area of the display.

16. The system of claim 13, wherein the display is backlit.

17. The system of claim 13, wherein the display is frontlit.

18. The system of claim 13, wherein the display is a Liquid Crystal Display (LCD).

19. The system of claim 13, wherein the display is an Organic Light-Emitting Diode (OLED).

20. The system of claim 13, wherein the display is a Microscopic Light-Emitting Diode (MicroLED).

* * * * *